United States Patent [19]

Redell et al.

[11] Patent Number: 4,526,538

[45] Date of Patent: Jul. 2, 1985

[54] DEVICE FOR SUPPORTING FLAT CERAMIC OBJECTS TO BE FIRED IN A CONTINUOUSLY HEATING FURNACE

[75] Inventors: Dietrich Redell, Berlin; Dieter Schmidt, Aschau, both of Fed. Rep. of Germany

[73] Assignee: W. Haldenwanger Technische Keramik GmbH & Co. KG, Fed. Rep. of Germany

[21] Appl. No.: 570,514

[22] Filed: Jan. 13, 1984

[30] Foreign Application Priority Data

Jan. 17, 1983 [DE] Fed. Rep. of Germany ....... 3301660

[51] Int. Cl.$^3$ .......................... F27D 3/00; F24D 23/02
[52] U.S. Cl. ......................................... 432/246; 432/2; 432/239
[58] Field of Search .................... 432/2, 236, 239, 246

[56] References Cited

U.S. PATENT DOCUMENTS 3,511,482  5/1970  Haite .................................. 432/246
3,830,625  8/1974  Cable et al. ........................ 432/236
4,200,431  4/1980  Knaak ................................ 432/246

FOREIGN PATENT DOCUMENTS 661813  6/1938  Fed. Rep. of Germany ...... 432/246

Primary Examiner—John J. Camby
Attorney, Agent, or Firm—Basile, Weintraub & Hanlon

[57] ABSTRACT

A device for supporting flat ceramic objects, particularly glazed floor or wall tiles, to be fired in a continuous heating furnace where the objects can be moved on rollers which are in the form of tubes. These tubes are equipped with raised and indented portions with the objects to be fired only being supported by the raised portions during transport through the furnace.

7 Claims, 4 Drawing Figures

DEVICE FOR SUPPORTING FLAT CERAMIC OBJECTS TO BE FIRED IN A CONTINUOUSLY HEATING FURNACE

BACKGROUND OF THE INVENTION

I. Field of the Invention

The present invention relates to devices for supporting flat ceramic objects to be fired in a continuously heating furnace.

II. Description of the Prior Art

It is known that ceramic objects, for example glazed wall or floor tiles, are fired in continuously heating furnaces. During this process the ceramic objects are placed upon rollers in the form of tubes which are rotated in the same direction, and the objects to be fired are moved through the furnace while positioned on the respective rollers. This means that the rollers simultaneously serve as a means of transport. The roller-type continuously heating furnaces are equipped with various zones having different temperatures corresponding to the temperature at which the glaze evaporates. The resultant vapors are deposited in the firing zone just ahead of the high temperature zone in a temperature range between 1050° C. and 1150° C. and in particular are also deposited on the rollers. As a result, the glaze can accumulate upon the rollers in this zone of the furnace covering a length of 8 to 10 meters. In the case of glazes with high alkali or lead oxide content, this may result in a thick layer within a period of time from several weeks to several months. The deposited glaze has strong adhesive properties so that the undersides of the objects to be fired adhere to the rollers during transport, resulting in clay particles being pulled out of the undersides of the ceramic objects which further increases the build-up layer on the tubes. In other familiar continuously heating furnaces, base plates are installed on the rollers which are moved through the furnace on the rollers. The material to be fired is placed on the base plates. The glaze vapor is deposited upon the rollers and plates to a very low degree and no particles are torn from the objects to be fired when employing this arrangement; however, the use of the base plates results in a higher energy consumption in continuous heating furnaces of this type.

In order to avoid the problem of the material to be fired adhering to the rollers in the continuous heating furnace, the rollers were equipped with a fireproof kaolin-engobe layer upon which the glaze precipitates but from which the precipitated material can be easily removed by grinding or sanding after the rollers have been pulled from the furnace and have cooled. This, however, necessitates an additional process step when firing objects which requires a greater expenditure of time and which renders the process less economical.

It is to this problem that the present invention applies. It is based upon the requirement to create a device for supporting flat ceramic objects to be fired in a continuous heating furnace, guaranteeing flawless support and transport of the objects to be fired in spite of the glaze precipitation without the material to be fired baking on the rollers.

SUMMARY OF THE INVENTION

According to this invention, this requirement is met by the characteristic properties of the main claim combined with the characteristics of the introductory specifications.

As a result of the fact that the tubes serving as rollers are equipped with raised and lowered portions over their entire width and the fact that the objects to be fired are supported by the raised portions only, the contact surface between the underside of the objects to be fired and the rollers is reduced to a great extent so that the effective adhesive surface is minimal. The glaze vapor predominantly settles in the indented portions of the rollers which do not come in contact with the objects to be fired.

BRIEF DESCRIPTION OF THE DRAWINGS

Examples for different versions of the present invention are explained in greater detail in the description and shown in the illustration in which.

DESCRIPTION OF THE PREFERRED EMBODIMENTS

Figure 1:
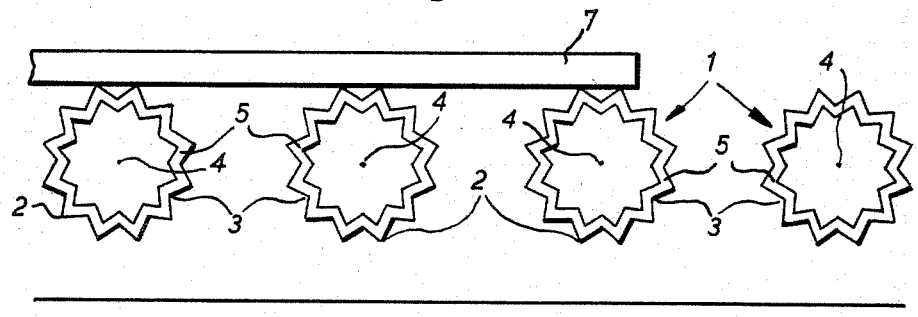
FIG. 1 shows a cross section through one part of a continuous heating furnace.

In the partial section through a continuous heating furnace shown in FIG. 1, or rollers 1 having a star-shaped cross section are arranged in a freely suspended manner in a parallel position to each other. The cross sections of the tubes is illustrated approximately in their actual size. The walls 5 of the tubes 1 show raised portions 2 and indented portions 3. An object 7 to be fired is placed upon tubes 1, that is, upon the the raised portions 2 of the star-shaped tubes 1. The tubes 1 are suspended at their sides and are rotated in the same direction about rotational axes 4. Thus, the object 7 to be fired is moved through the continuous heating furnace on the tubes 1. The glaze vapors occurring in the firing zone just ahead of a high temperature zone within the furnace precipitates predominantly upon the indented portions 3 of the tubes 1 which do not come in contact with the object 7 to be fired, such as tiles, which pass through the furnace so that the vapors and precipitate cannot result in the aforementioned adhesive effect. At the tips, that is, along the raised portions 2 of the tubes 1, there is only a minimal precipitation of the glaze vapors so that adhesion between the tubes 1 and the object 7 does not occur. The star-shaped tubes 1 can be used as a transport means until the indented portions 3 are filled up by the precipitated glaze vapors and until the originally star-shaped cross section of the tubes 1 approaches a circular cross section. This, however, occurs only after prolonged usage.

Figure 2:
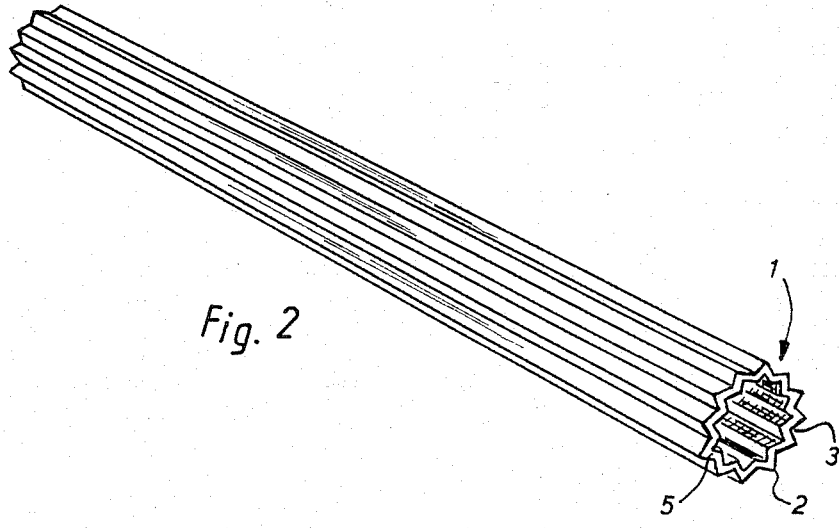
FIG. 2 shows a perspective view of a star-shaped tube which is used as the means of transport in the continuous heating furnace.
Figure 3:
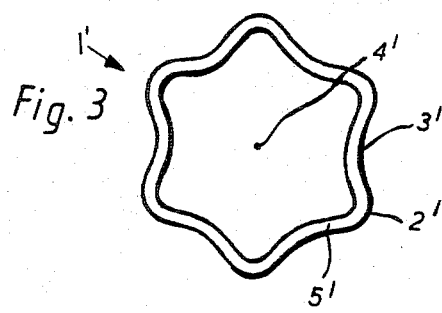
FIG. 3 represents a cross section through an additional version of the tube.

FIG. 2 shows the star-shaped tube 1 in its entire length. FIG. 3 shows the cross section of another version of the tube 1 where the raised portions 2' and the indented portions 3' are formed by differing curves of various degrees. Corresponding with the versions shown in FIGS. 1 and 2, the tubes 1 shown in FIG. 3 are rotated around their rotational axis 4'.

Figure 4:
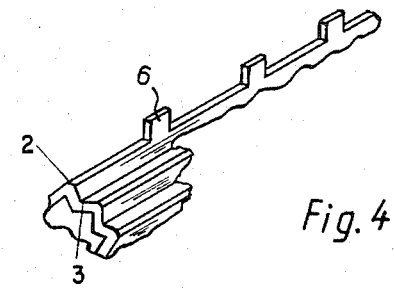
FIG. 4 shows a section of a perspective view of a star-shaped tube which is also equipped with additional projections along the entire length of the raised portions of the tube.

FIG. 4 shows an additional measure for extending the service life of a tube 1 with raised and indented portions. The tube 1 is equipped with spaced projections 6 along the raised portions 2 over the entire length of the tube 1 with the object 7 to be fired being placed and transported on the projections 6. The precipitated glaze vapor must fill up the indented portions 3 and then must build up an additional layer having the height of the projections 6.

The tubes 1 are preferably made of a ceramic material, but it is also feasible to use metal tubes having a corresponding high temperature resistance.

We claim:

1. A device for supporting and conveying flat ceramic objects to be fired in a continuous heating furnace comprising:
   a plurality of co-planar rollers each rotatable about a longitudinally extending central axis, the rollers having a tubular configuration with an outer surface, each roller having a plurality of radially extending, circumferentially spaced, alternating, raised and indented portions formed in the outer surface and extending longitudinally along each roller.

2. The device of claim 1 wherein the rollers have a star-shaped cross section.

3. The device of claim 1 wherein the rollers have a star-shaped cross section with rounded raised portions (2) and indented portions (3).

4. The device of claim 1 further including a plurality of radially extending, longitudinally spaced projections formed on the raised portions of the rollers.

5. The device of claim 1 wherein the rollers are fabricated from a ceramic material.

6. The device of claim 1 wherein the rollers are fabricated from metallic material.

7. The device of claim 1 wherein the raised portions terminate in a pointed apex, the object being supported and transported only on the apex of the raised portions of each roller.

* * * * *